United States Patent
Conner et al.

[19]

[11] Patent Number: 5,868,481
[45] Date of Patent: Feb. 9, 1999

[54] CENTRIFUGAL ILLUMINATION SYSTEM

[75] Inventors: Arlie R. Conner, Tualatin; David K. Booth, Tigard, both of Oreg.

[73] Assignee: Lightware, Inc., Beaverton, Oreg.

[21] Appl. No.: 758,284

[22] Filed: Nov. 8, 1996

[51] Int. Cl.⁶ .................................................. G03B 21/14
[52] U.S. Cl. .............................. 353/38; 353/102; 353/69; 385/901
[58] Field of Search .................. 353/38, 102, 69, 353/122; 362/32, 335, 336, 308; 359/800; 385/133, 901

[56] References Cited

U.S. PATENT DOCUMENTS

| | | | |
|---|---|---|---|
| 5,628,553 | 5/1997 | Booth et al. | 353/102 |
| 5,634,704 | 6/1997 | Shikama et al. | 353/102 |
| 5,645,334 | 7/1997 | Tejima et al. | 353/38 |
| 5,662,400 | 9/1997 | Shikama et al. | 353/102 |

*Primary Examiner*—William Dowling
*Attorney, Agent, or Firm*—Hancock Meininger & Porter LLP

[57] ABSTRACT

An image display system such as an LCD projection display includes an illumination homogenizer and a centrifugal relay lens system. The illumination homogenizer, such as a reflective tunnel homogenizer or integrator, efficiently provides uniform distribution of light over a region matched to the configuration of an LCD, or other type of image source. The centrifugal relay lens system includes, for example, an S-curve aspheric lens surface that functions to increase the illumination distribution toward the edges and corners of the image source relative to the center. The projection system provides illumination with improved uniformity and efficiency while also providing a shortened optical pathway.

25 Claims, 7 Drawing Sheets

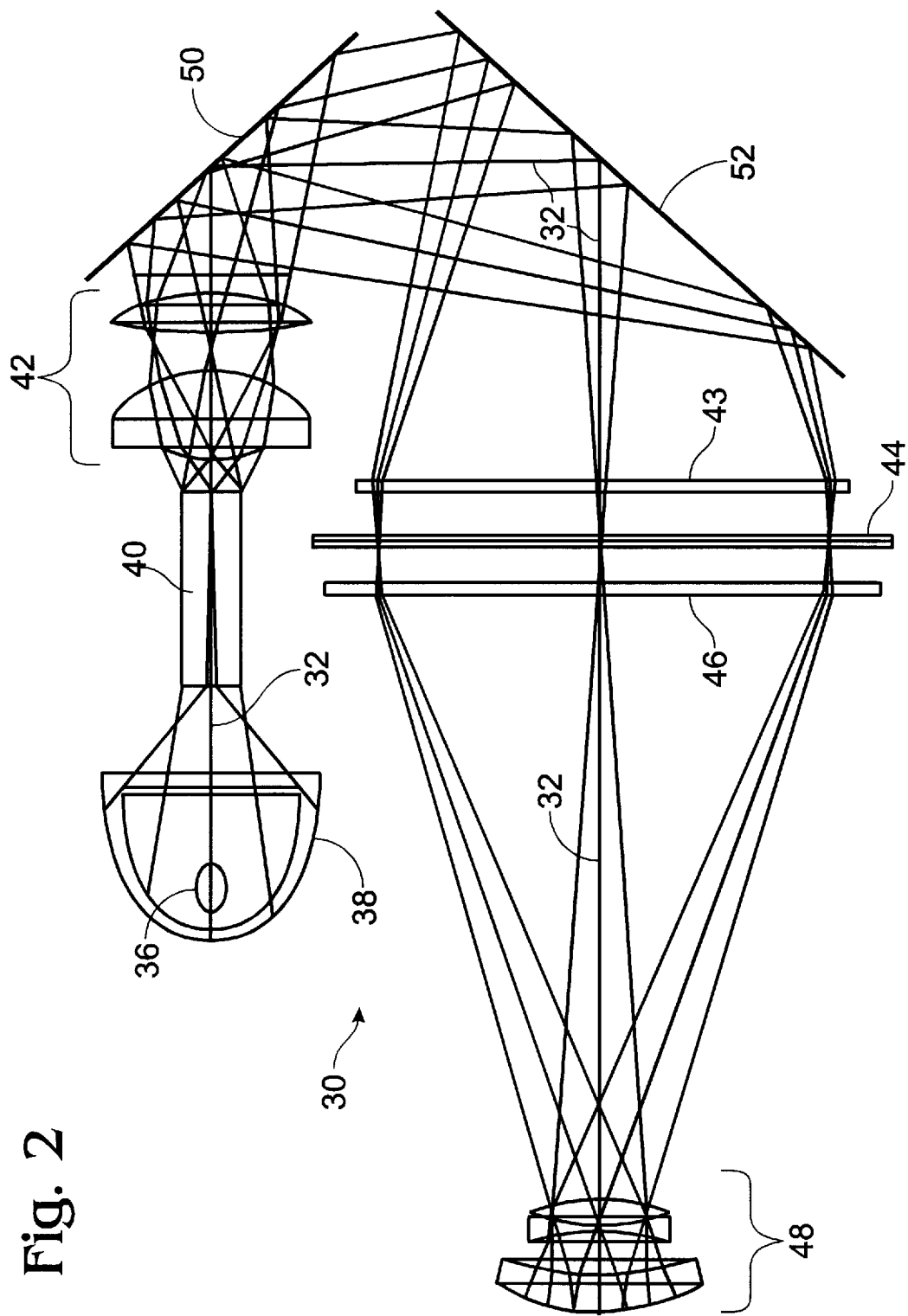

CENTRIFUGAL ILLUMINATION SYSTEM

FIELD OF THE INVENTION

The present invention relates to illumination systems such as are used in liquid crystal display projectors and, in particular, to such illumination systems with improved brightness uniformity and illumination efficiency.

BACKGROUND OF THE INVENTION

Many image display systems generate display images and project them onto display screens, typically for viewing by multiple persons or viewers. The display images may be formed by transmitting light from a high-intensity light source through an image-forming medium such as a translucent film or liquid crystal display (LCD). Alternatively, the display images may be formed by reflecting the light off of a reflective image-forming medium such as a digital micromirror display. The following description is directed by way of example to transmissive LCD display systems, but is similarly applicable to reflective display systems.

FIG. 1 is a schematic side view optical diagram of a conventional prior art front LCD projector 10 that projects display images along a central optic axis 12 upward toward a reflective display screen 14. LCD projector 10 includes an illumination or light source 16 and a light-collecting reflector 18 that direct polychromatic, substantially white light through a spherical condenser lens 20. A display system configured as a front LCD projector is positioned with the viewers in front of a reflective display screen. A display system configured as a rear projection display is positioned opposite the viewers behind a transmissive display screen.

A fold mirror 21 directs the light through a Fresnel collimating lens 22 that collimates the light for delivery to an image source 24 such as a transmissive color thin-film transistor (TFT) active matrix LCD together with any required polarizing elements. As is known in the art, image source 24 controls or modulates the substantially white light to form a multi- or full-color display object according to a video display signal delivered to image source 24 from display control circuitry (not shown). The light that passes through the display object propagates to a Fresnel converging lens 26 that focuses the light toward a conventional objective projection lens assembly 28 such as a varifocal lens assembly.

Typically, reflector 18 is of a parabolic or elliptical shape and forms a round illumination pattern. Image source 24 typically has a rectangular configuration. To assure that all of it is illuminated, image source 24 is overfilled by the round illumination area, which causes between 30 and 40 percent of the illumination to be lost or wasted. Illuminating the corners of image source 24 with intensity equal to that of its center causes even more light to be lost.

Illumination efficiency can be improved by using a reflective tunnel integrator or homogenizer having a rectangular output face. The homogenizer may be formed as a hollow mirror tunnel or a solid rectangular glass rod. A benefit of such a homogenizer is that it increases both the uniformity and the efficiency with which image source 24 is illuminated. With conventional optics, uniformity and efficiency are typically opposed characteristics. A disadvantage of such a tunnel homogenizer, however, is that it is very bulky and has a long path length requirement, thereby being ill-suited to portable projection systems.

Attempting to shorten such a long path length with a conventional spherical relay lens system introduces pin cushion distortion into the illumination pattern formed by the tunnel homogenizer. This pin cushion distortion weakens the illumination intensity at the edges of image source 24, particularly at its corners, and also decreases the overall illumination efficiency. As a consequence, attempts to shorten the path length requirements of a tunnel homogenizer have required unacceptable loss of the uniformity and efficiency enhancements of the homogenizer.

Prior art LCD projectors commonly suffer from illumination non-uniformity and excessive losses of illumination. Such losses are particularly problematic because of illumination intensity limitations in transmissive LCD displays. Although reflective tunnel homogenizers are capable of providing improved uniformity and efficiency, the path length and size requirements for such homogenizers are incompatible with LCD projectors and other image display systems.

SUMMARY OF THE INVENTION

An object of the present invention is, therefore, to provide an illumination system.

Another object of this invention is to provide such an illumination system with improved illumination uniformity.

A further object of this invention is to provide such an illumination system with improved illumination efficiency.

Yet another object of this invention is to provide such an illumination system with a shortened optical path length.

The present invention includes an image display illumination system having an illumination homogenizer, such as a reflective tunnel homogenizer, and a centrifugal relay lens system that receives illumination from a light source and directs the illumination toward an image source such as an LCD. The illumination homogenizer efficiently provides uniform distribution of light over a region matched to the configuration of the LCD image source.

The centrifugal relay lens system includes, for example, an S-curve aspheric lens surface that functions to increase the illumination distribution toward the edges and corners of the image source and away from the center, thereby emphasizing marginal illumination relative to central illumination. A second aspheric surface sharply images illumination light toward the image source over a short distance while counteracting pin cushion distortion with the converse barrel distortion. As a result, the projection system of the present invention provides illumination with improved uniformity and efficiency while also providing a shortened optical path length.

Illumination systems according to the present invention are suitable for use in a wide variety of illumination applications including direct lighting and transmissive and reflective image display systems.

The foregoing and other features and advantages of preferred embodiments of the present invention will be more readily apparent from the following detailed description, which proceeds with reference to the accompanying drawings.

BRIEF DESCRIPTION OF THE DRAWINGS

FIG. 2 is a diagrammatic side view of a rear projection LCD projector employing a projector illumination system of the present invention.

DETAILED DESCRIPTION OF PREFERRED EMBODIMENTS

Figure 1:
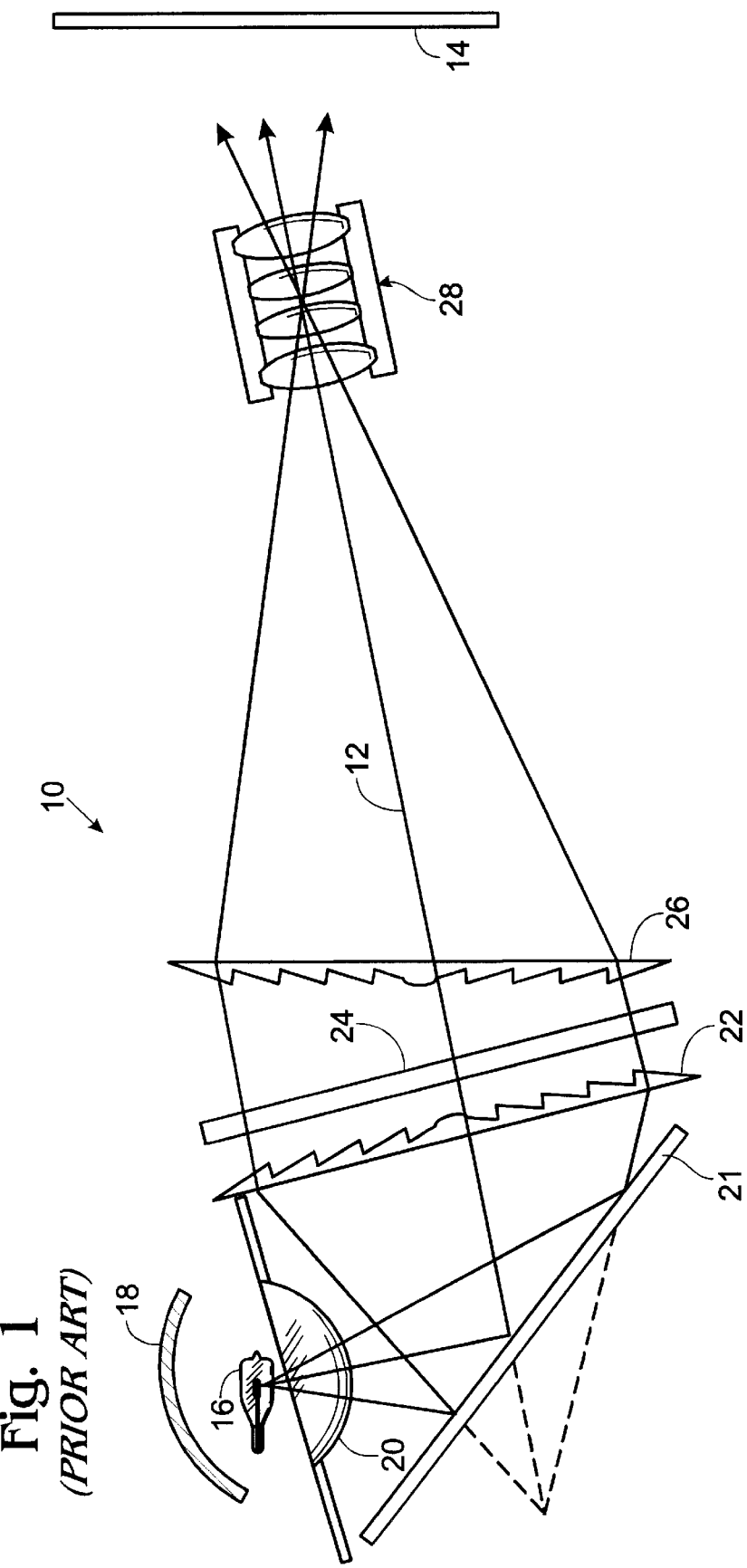
FIG. 1 is a diagrammatic side view of a conventional prior art projector.

FIG. 2 is a schematic side view optical diagram of a rear projection display 30 that projects display images along a central optic axis or path 32 toward a rear surface of a display screen (not shown). LCD display 30 includes an illumination or light source 36 and a light-collecting reflector 38 that direct polychromatic, substantially white light through an illumination homogenizer 40, such as a reflective tunnel homogenizer, to a centrifugal relay lens system 42, as described in greater detail below.

The light passes through a collimating lens 43 (e.g., of the Fresnel type) that collimates the light for delivery to an image source 44. Image source 44 preferably is a transmissive color thin-film transistor (TFT) active matrix LCD of the type available from Sharp Corporation of Osaka, Japan, together with any required polarizing elements. Alternatively, image source 44 could be any other type of suitable transmissive display panel.

As is known in the art, image source 44 controls or modulates the substantially white light to form a multi- or full-color display object according to a video display signal delivered to image source 44 from display control circuitry (not shown). The video display signal may be in the form of, for example, a computer display signal that is generated in real-time or retrieved from a computer memory or a television signal obtained from a broadcast or a video recording medium. The light of the display object propagates to a converging lens 46 (e.g., Fresnel) that focuses the light toward a conventional objective projection lens assembly 48. A pair of fold mirrors 50 and 52 optionally fold optical path 32 so it fits within a compact housing (not shown).

Figure 3A:
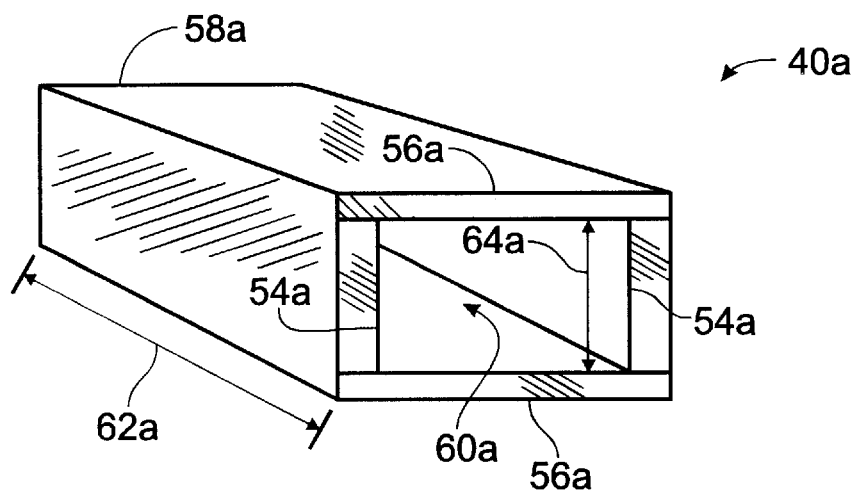
FIGS. 3A and 3B are isometric views of preferred illumination homogenizers included in an embodiment of the present invention.

FIG. 3A is an isometric diagram of an embodiment of illumination homogenizer 40, designated homogenizer 40a, configured as two perpendicular pairs of reflective faces 54a and 56a. Preferably, each of the faces in a pair is parallel so that homogenizer 40a forms a rectangular input 58a of substantially the same dimensions as its output 60a. With image source 44 being a 640×480 square pixel LCD, for example, input 58a and output 60a would preferably have the same 4:3 rectangular aspect ratio as image source 44. It will be appreciated, however, that opposed pairs 54a and 56a need not be parallel and that input 58a and output 60a can, therefore, be of different dimensions to conform output 60a to the aspect ratio of image source 44.

Homogenizer 40a is capable of providing at its output 60a a uniform spatial distribution of light given, for example, a Gaussian spatial distribution of light at its input 58a. Such homogenization or integration of the spatial distribution of light is obtained as a result of the multiple small angle reflections that occur within homogenizer 40a. It has been determined that a homogenizer length 62a that is at least about three times the dimension of the smallest side 64a provides adequate homogenization of the illumination. In this embodiment, homogenizer 40a is formed as four mirrors that are adhered together at their edges. The mirrors may be, for example, silver mirrors with overcoating available as Silflex™ mirrors from Balzer Corporation of Fremont, Calif. Such mirrors have high reflection efficiency of about 97 percent and are particularly effective with small angle reflections.

Figure 3B:
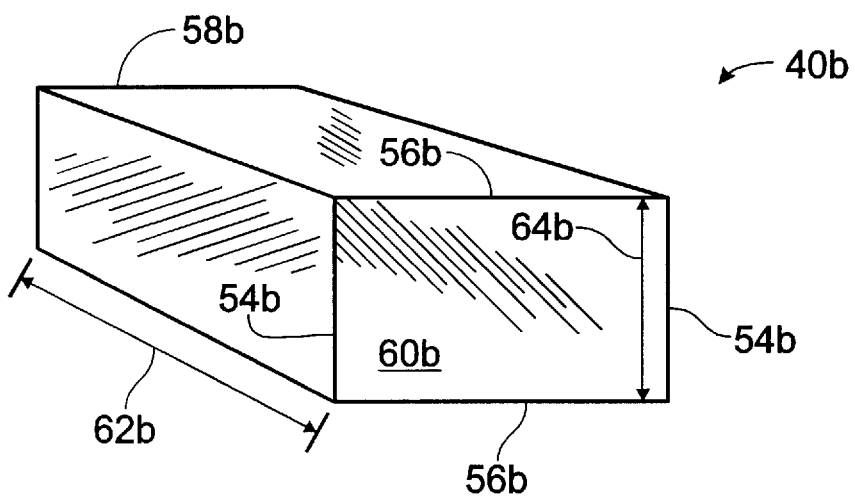

FIG. 3B shows another embodiment of homogenizer 40, designated homogenizer 40b, that is formed as a solid uncoated rectangular prism that has a solid interior and operates with total internal reflection for the small angle reflection. Despite its different construction, homogenizer 40b operates in substantially the same manner as homogenizer 40a. Accordingly, the common elements of homogenizers 40a and 40b are identified by common reference numerals and the respective suffixes "a" and "b."

Figure 4:
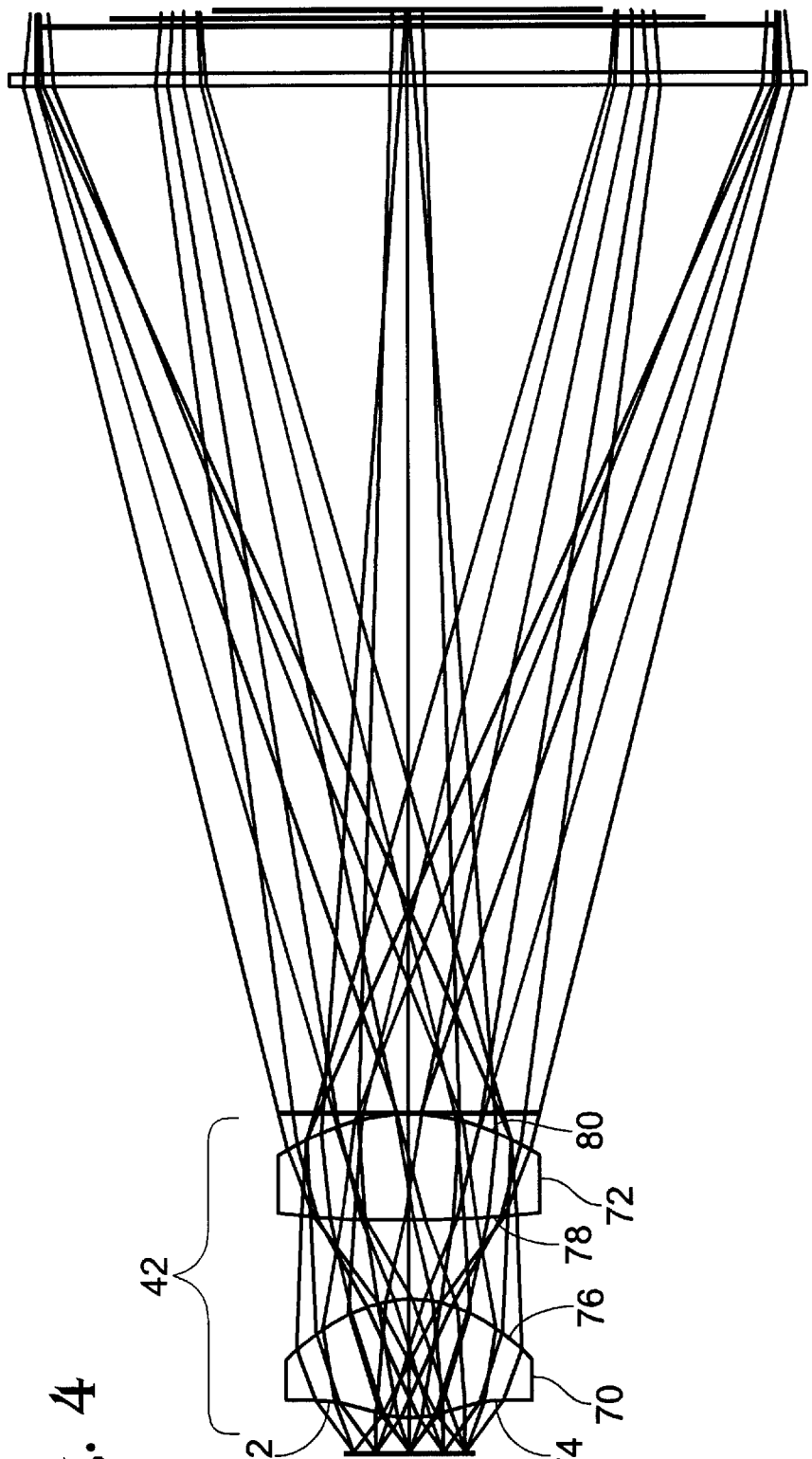
FIG. 4 is a schematic side view of a centrifugal relay lens system of the present invention.

FIG. 4 is an enlarged diagram of a preferred centrifugal relay lens system 42 having a centrifugal relay lens 70 and a separate short focusing relay lens 72. Lenses 70 and 72 each include an aspheric surface. As a result, lenses 70 and 72 are formed separately to simplify their manufacture. Centrifugal relay lens 70 functions to increase the illumination distribution toward the edges and corners of LCD display 30 and away from its center, thereby emphasizing marginal illumination relative to central illumination. Short focusing relay lens 72 sharply images illumination light toward LCD display 30 over a short distance while counteracting the pin cushion distortion characteristic of short-focus conventional spherical relay lens systems by tending to induce barrel distortion.

The illumination distribution provided by homogenizer 40 and centrifugal relay lens 42 preferably compensate for illumination non-uniformities further caused by collimation lenses 43 and converging lenses 46 of the Fresnel type. Fresnel collimating lens 43 exhibits a decrease in transmitted light at increasing distances from optical axis 32 because of the increasing amounts of light that are deflected by the "risers" of the Fresnel lens facets. Similarly, light passing through the LCD and entering the faceted face of the converging Fresnel lens is sometimes totally internally reflected at the inside surface of the risers.

Figure 5A:
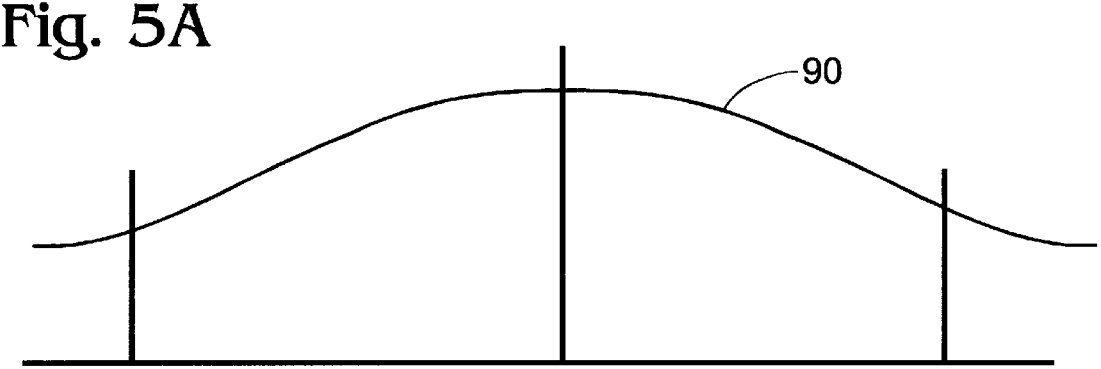
FIGS. 5A and 5B are diagrammatic graphical illustrations of corner-to-corner (diagonal) illumination distribution provided by conventional optics and the present invention, respectively.
Figure 5B:
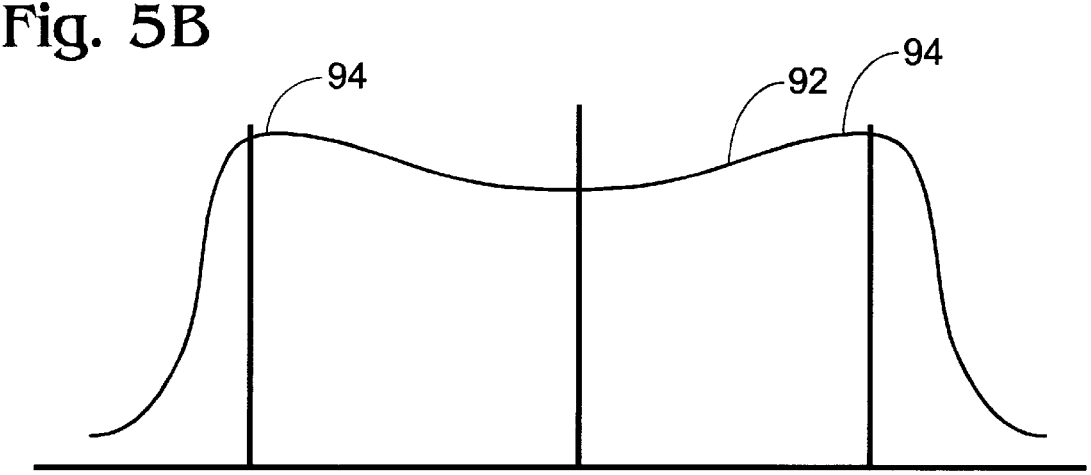

Offsetting these Fresnel lens characteristics is a pre-enhanced brightness distribution of light provided by homogenizer 40 and centrifugal relay lens 42. FIG. 5A is a diagrammatic graphical illustration showing corner-to-corner (diagonal) Gaussian illumination distribution 90 provided by conventional prior art illumination optics. FIG. 5B is a diagrammatic illustration of corner-to-corner (diagonal) pre-enhanced centrifugal illumination distribution 92 provided by homogenizer 40 and centrifugal relay lens system 42.

Conventional Gaussian illumination distribution 90 with its radially decreasing brightness exacerbates the illumination degradation away from the center caused by Fresnel collimating and converging lenses. In contrast, pre-enhanced illumination distribution 92 includes illumination peaks 94 away from the center that compensate for the effects of collimating and converging fresnel lenses, thereby emphasizing marginal illumination relative to central illumination. As a result, homogenizer 40 and centrifugal relay lens system 42 are capable of providing at least fifty percent more illumination intensity at (e.g., corners) portions of an LCD away from its center.

Centrifugal lens 70 includes an even asphere surface 74 and a spherical surface 76. Asphere surface 74 includes an S-curve sectional shape with an inflection 82 between oppositely curved regions. Short focus lens 72 includes an even aspheric surface 78 and a spherical surface 80. Table 1 lists the characteristics of a first preferred embodiment for utilization in, for example, a rear projection type display. As is known in the art, the radius refers to the radius of curvature of the spherical surface or the zero order component of an aspherical surface, the thickness refers to the maximum extent of the lens component, and the diameter refers to the optically active diameter of the lens. Glass B270 is available from Schott Glass of Germany and is a fine-polished moldable glass. Other optically equivalent glasses, such as K5, are also available.

TABLE 1

| Surf | Type | Radius (mm) | Thickness (mm) | Glass | Diameter (mm) |
|---|---|---|---|---|---|
| 74 | EVENASPH | 40 | 31.5 | B270 | 43 |
| 76 | STANDARD | −34 | 11 | | 60 |
| 78 | EVENASPH | 126 | 26 | B270 | 56 |
| 80 | STANDARD | −43 | 1 | | 61 |

As is known in the art, an even asphere surface is rotationally symmetric and is commonly described by polynomial expansions of the deviation from a spherical surface (or an aspheric described by a conic surface). The even asphere surface model uses only even powers of the radial coordinate to describe the asphericity. A model uses the base radius of curvature and the conic constant. The surface "sag" is represented as:

$$z = \frac{cr^2}{1 + \sqrt{1 - (1+k)c^2r^2}} + a_2 r^2 + a_4 r^4 + a_6 r^6 + a_8 r^8 + a_{10} r^{10} + \ldots$$

With regard to this common representation, aspheric surfaces 74 and 78 of lenses 70 and 72 in this first embodiment are represented by purely polynomial surfaces in which the conic constant k is −1 and the coefficients for the polynomial terms are set forth in the following respective Tables 2A and 2B.

TABLE 2A

| Surface 74 | Even Asphere |
|---|---|
| Coeff on $r^2$ | 0.01316687 |
| Coeff on $r^4$ | −5.845321e-005 |
| Coeff on $r^6$ | 3.2984083e-008 |
| Coeff on $r^8$ | 3.383841e-011 |
| Coeff on $r^{10}$ | −3.799305e-014 |

TABLE 2B

| Surface 78 | Even Asphere |
|---|---|
| Coeff on $r^2$ | −0.0004970065 |
| Coeff on $r^4$ | −3.769223e-006 |
| Coeff on $r^6$ | 4.484616e-010 |
| Coeff on $r^8$ | 2.154815e-012 |
| Coeff on $r^{10}$ | −3.316472e-015 |

In this rear projection application, lens system 42 preferably delivers the illumination to a collimating Fresnel lens 43 separated from surface 80 by a distance of about 212 mm and defined by the even asphere coefficients set forth in Table 2C.

TABLE 2C

| Fresnel 43 | Fresnel |
|---|---|
| Coeff on $r^2$ | −0.005 |
| Coeff on $r^4$ | −1.077e-008 |
| Coeff on $r^6$ | 8.963e-014 |

In another embodiment, lens system 40 is used in a front projection application. Preferred dimensions and coefficients for this application are set forth in Tables 3 and 4. In this embodiment, collimating fresnel lens 43 is separated from surface 80 by a distance of about 250 mm. Surfaces in this embodiment also are represented by purely polynomial terms in which the conic constant k is ×1.

TABLE 3

| Surf | Type | Radius | Thickness | Glass | Diameter |
|---|---|---|---|---|---|
| 74 | EVENASPH | 40 | 28.5 | B270 | 42 |
| 76 | STANDARD | −33 | 24.5 | | 56 |
| 78 | STANDARD | 148 | 15 | B270 | 60 |
| 80 | EVENASPH | −46 | 1 | | 60 |

TABLE 4A

| Surface 74 | Even Asphere |
|---|---|
| Coeff on $r^2$ | 0.009262441 |
| Coeff on $r^4$ | −5.206053e-005 |
| Coeff on $r^6$ | 6.541629e-008 |
| Coeff on $r^8$ | −3.925462e-011 |

TABLE 4B

| Surface 78 | Even Asphere |
|---|---|
| Coeff on $r^2$ | 0.002692884 |
| Coeff on $r^4$ | −3.699515e-006 |
| Coeff on $r^6$ | 1.336496e-008 |
| Coeff on $r^8$ | −1.183279e-011 |
| Coeff on $r^{10}$ | 3.651595e-015 |

TABLE 4C

| | Fresnels |
|---|---|
| Coeff on $r^2$ | −0.0039 |
| Coeff on $r^4$ | −5.3775e-009 |
| Coeff on $r^6$ | 2.554e-014 |
| Coeff on $r^8$ | −1.282e.025 |

Figure 6A:
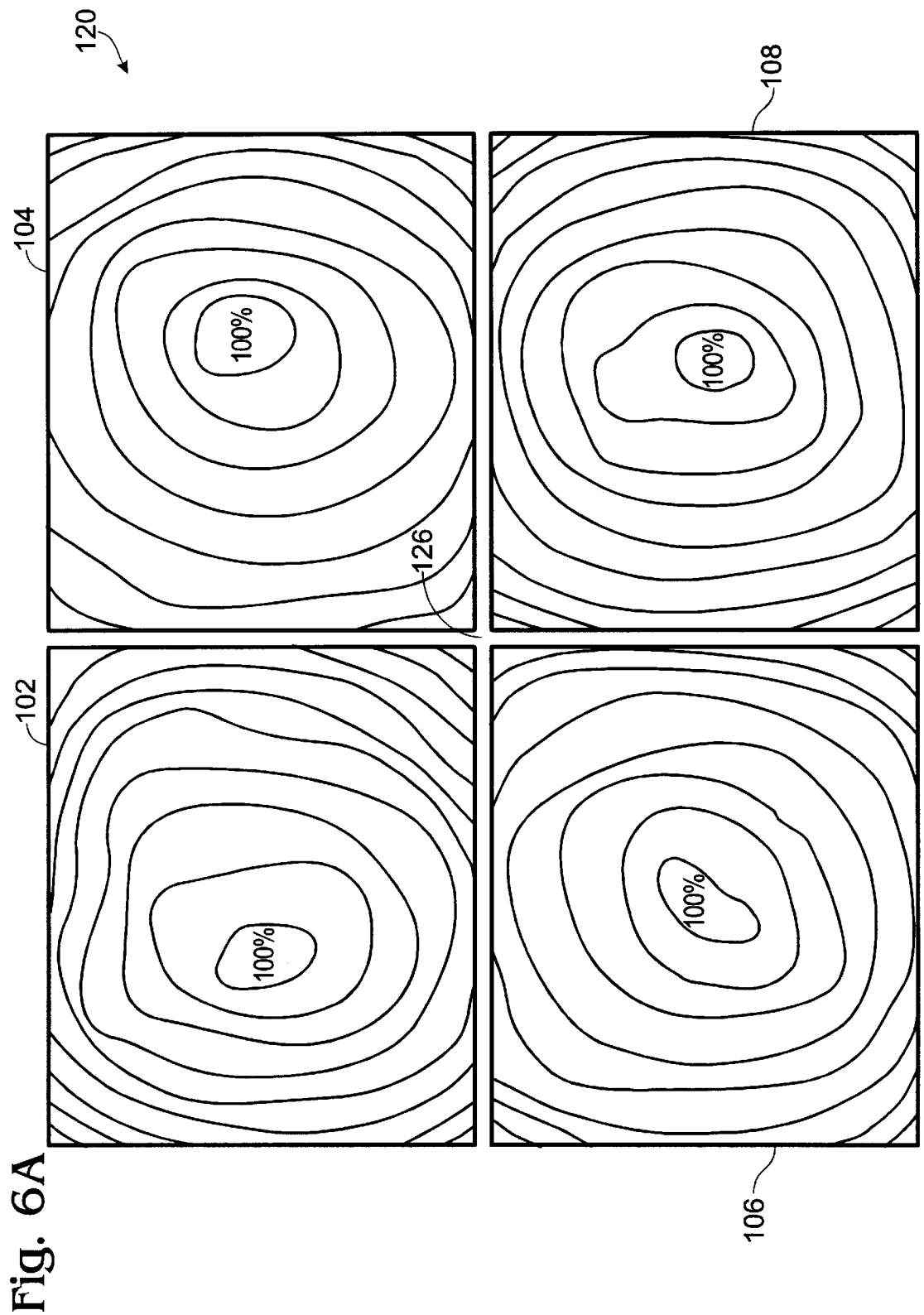
FIGS. 6A and 6B are diagrammatic iso-brightness contours for multiple screen (2×2) rear projection displays systems ("video walls") employing, respectively, a conventional illumination system and an illumination system according to the present invention.
Figure 6B:
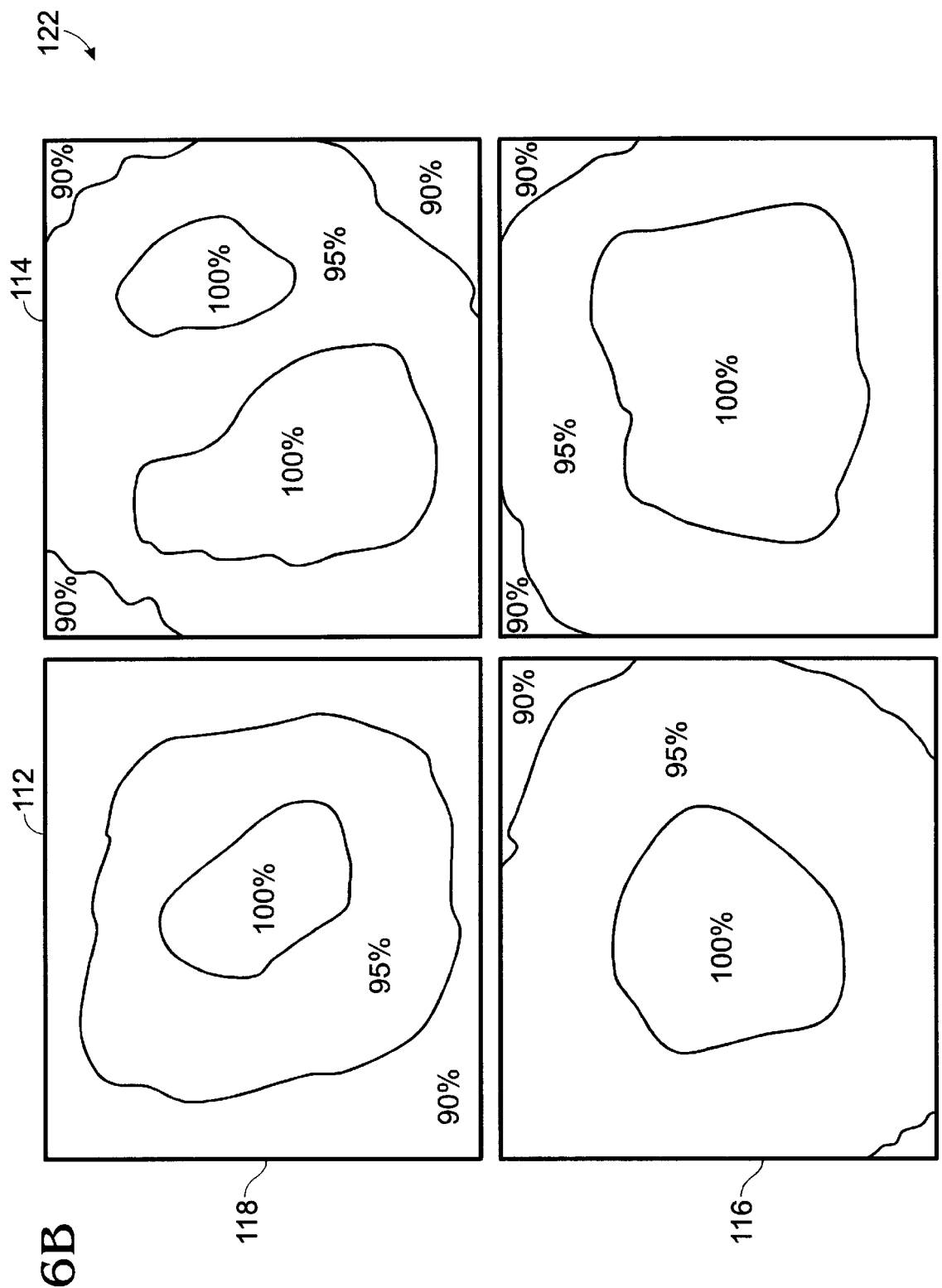

FIGS. 6A and 6B are diagrammatic iso-brightness contours for multiple screens 102–108 and 112–118 of (2×2) rear projection display system video walls 120 and 122, respectively. A video wall is a composite imaging system in which multiple display screens are positioned close together to form in combination a large, integrated, single display. Video wall 120 of FIG. 6A employs a conventional illumination system, and video wall 122 of FIG. 6B employs an illumination system according to the present invention.

The iso-brightness contour rings represent common illumination brightnesses at intervals of 5% from the 100% illumination at the center of each display screen. Although similarly applicable to single screen front and rear displays, the iso-brightness contours of FIGS. 6A and 6B illustrate an application in which the brightness variations between the center and margin of a display are critical to display performance and acceptability.

FIG. 6A shows a monotonically decreasing brightness variation from the center of each of display screens 102–108 caused by conventional illumination systems. Corners of all the display screens 102–108 meet at an intersection 124 where the iso-brightness contours represent brightnesses of 60%–70% of the brightnesses at the centers of the displays. Such brightness variations at intersections 124 in video walls are unacceptable because the variations are readily apparent to viewers and, as a consequence, disrupt the integrated single display functionality of video walls.

FIG. 6B shows a centrifugal brightness distributions for each of display screens 112–118 provided by illumination systems according to the present invention. Corners of all the display screens 112–118 meet at an intersection 126 where the iso-brightness contours represent brightnesses of about 90–95% of the brightnesses at the centers of the displays. The centrifugal nature of the illumination distribution, in which the illumination distribution is increased toward the edges and corners of the display and away from the center, is illustrated by the resulting high illumination uniformity for each of display screens 112–118. It will be appreciated, therefore, that the centrifugal illumination system of the present invention emphasizes the marginal illumination relative to central illumination.

Having illustrated and described the principles of the present invention in a preferred embodiment, it should be apparent to those skilled in the art that the embodiment can be modified in arrangement and detail without departing from such principles. For example, the preferred embodiments have been described with reference to LCD projectors. However, the illumination system of this invention is similarly suitable for image display systems with transmissive image sources other than LCDs. Accordingly, we claim as our invention all such embodiments as come within the scope and spirit of the following claims and equivalents thereto:

We claim:

1. In a display system having an illumination source that directs light along an optical path toward an image source to form a display image, the improvement comprising:
    an illumination homogenizer having an optical input and an optical output, light from the light source arriving at the optical input with a first illumination distribution uniformity and departing the optical output with a second illumination distribution uniformity greater than the first; and
    a centrifugal relay lens system in the optical path between the illumination homogenizer and the image source to direct illumination of the image source away from its center.

2. The display system of claim 1 in which the centrifugal relay lens system includes an S-curve aspheric lens surface.

3. The display system of claim 1 in which the centrifugal relay lens system includes an aspheric lens surface with an inflection.

4. The display system of claim 1 in which the centrifugal relay lens system introduces barrel distortion.

5. The display system of claim 1 in which the centrifugal relay lens system includes a first relay lens with an S-curve aspheric lens surface and a second relay lens with a short focal length.

6. The display system of claim 5 in which the second relay lens includes an aspheric lens surface.

7. The display system of claim 1 in which the illumination homogenizer includes a reflective tunnel homogenizer.

8. The display system of claim 7 in which the reflective tunnel homogenizer includes reflective surfaces that face each other across a tunnel interior that is solid.

9. The display system of claim 7 in which the reflective tunnel homogenizer includes reflective surfaces that face each other across a tunnel interior that is open.

10. The display system of claim 1 further comprising a forward projection lens system for projecting the display image toward a front surface of a reflective display screen.

11. The display system of claim 1 further comprising a rearward projection lens system for projecting the display image toward a rear surface of a transmissive display screen.

12. In a display having an illumination source that directs light along an optical path toward an image source to form a display image, the improvement comprising:
    a relay lens system in the optical path between the illumination source and the image source and having a first relay lens with an S-curve aspheric lens surface and a second relay lens with a short focal length.

13. The display of claim 12 in which the second relay lens includes an aspheric lens surface.

14. The display of claim 12 further comprising a forward projection lens system for projecting the display image toward a front surface of a reflective display screen.

15. The display of claim 12 further comprising a rearward projection lens system for projecting the display image toward a rear surface of a transmissive display screen.

16. A rear projection LCD display having an illumination source that directs light along an optical path toward a LCD image source to form a display image that is projected toward a rear surface of a display screen, comprising:
    a reflective tunnel homogenizer; and a centrifugal relay lens system in the optical path between the reflective tunnel homogenizer and the image source to direct illumination of the image source away from its center.

17. The display of claim 16 in which the LCD image source has an image source configuration and the reflective tunnel homogenizer provides homogenized illumination in a configuration matched to the image source configuration.

18. The display of claim 16 in which the centrifugal relay lens system includes an S-curve aspheric lens surface.

19. The display of claim 16 in which the reflective tunnel homogenizer includes reflective surfaces that face each other across a tunnel interior that is solid.

20. The display of claim 16 in which the reflective tunnel homogenizer includes reflective surfaces that face each other across a tunnel interior that is open.

21. A front projection LCD display having an illumination source that directs light along an optical path toward a LCD image source to form a display image that is projected toward a front surface of a display screen, comprising:
    a reflective tunnel homogenizer; and
    a centrifugal relay lens system in the optical path between the reflective tunnel homogenizer and the image source to direct illumination of the image source away from its center.

22. The display of claim 21 in which the LCD image source has an image source configuration and the reflective tunnel homogenizer provides homogenized illumination in a configuration matched to the image source configuration.

23. The display of claim 21 in which the centrifugal relay lens system includes an S-curve aspheric lens surface.

24. The display of claim 21 in which the reflective tunnel homogenizer includes reflective surfaces that face each other across a tunnel interior that is solid.

25. The display of claim 21 in which the reflective tunnel homogenizer includes reflective surfaces that face each other across a tunnel interior that is open.

* * * * *